United States Patent
Koyama et al.

(10) Patent No.: US 9,626,273 B2
(45) Date of Patent: Apr. 18, 2017

(54) ANALYSIS SYSTEM INCLUDING ANALYSIS ENGINES EXECUTING PREDETERMINED ANALYSIS AND ANALYSIS EXECUTING PART CONTROLLING OPERATION OF ANALYSIS ENGINES AND CAUSING ANALYSIS ENGINES TO EXECUTE ANALYSIS

(75) Inventors: Kazuya Koyama, Tokyo (JP); Yoichi Nagai, Tokyo (JP); Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 14/355,834

(22) PCT Filed: Sep. 8, 2012

(86) PCT No.: PCT/JP2012/005932
§ 371 (c)(1),
(2), (4) Date: May 1, 2014

(87) PCT Pub. No.: WO2013/069191
PCT Pub. Date: May 16, 2013

(65) Prior Publication Data
US 2014/0289568 A1 Sep. 25, 2014

(30) Foreign Application Priority Data
Nov. 9, 2011 (JP) .................................. 2011-245149

(51) Int. Cl.
*G06F 11/30* (2006.01)
*G06F 11/34* (2006.01)

(52) U.S. Cl.
CPC ...... *G06F 11/3466* (2013.01); *G06F 11/3017* (2013.01); *G06F 11/3055* (2013.01); *G06F 11/3433* (2013.01)

(58) Field of Classification Search
CPC ............. G06F 11/3017; G06F 11/3055; G06F 11/3433; G06F 11/3466
See application file for complete search history.

(56) References Cited

U.S. PATENT DOCUMENTS 7,051,367 B1 * 5/2006 Krishnaswamy ....... H04L 47/10
709/223
8,046,404 B1 * 10/2011 Chalfin .................. H04L 47/17
370/229

(Continued)

FOREIGN PATENT DOCUMENTS

JP 11-237993 A 8/1999
JP 2003-303102 A 10/2003

(Continued)

OTHER PUBLICATIONS

International Search Report (ISR) (PCT Form PCT/ISA/210), in PCT/JP2012/005932, dated Oct. 30, 2012.

*Primary Examiner* — Eric Oberly
(74) *Attorney, Agent, or Firm* — McGinn IP Law Group, PLLC.

(57) ABSTRACT

An analysis system includes: analysis engines each executing predetermined analysis; an analysis executing part controlling operation of the analysis engines and causing the analysis engines to execute analysis; and a processing performance control part controlling processing performance of the analysis engines. The processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

14 Claims, 7 Drawing Sheets

(56) References Cited

U.S. PATENT DOCUMENTS

| | | | |
|---|---|---|---|
| 8,291,495 B1* | 10/2012 | Burns | H04L 63/0254 455/410 |
| 2003/0212831 A1 | 11/2003 | Yoshio | |
| 2004/0117794 A1* | 6/2004 | Kundu | G06F 9/505 718/102 |
| 2004/0139441 A1 | 7/2004 | Kaburaki et al. | |
| 2006/0153217 A1* | 7/2006 | Chu | H04L 12/1827 370/412 |
| 2007/0198871 A1* | 8/2007 | Nelken | G06F 9/4881 713/502 |
| 2008/0168466 A1* | 7/2008 | Nitta | G06F 9/5027 8/105 |
| 2013/0024871 A1* | 1/2013 | Gao | G06F 9/5083 8/105 |
| 2013/0061237 A1* | 3/2013 | Zaarur | G06F 9/4856 718/105 |

FOREIGN PATENT DOCUMENTS

| | | |
|---|---|---|
| JP | 2004-199678 A | 7/2004 |
| JP | 2004-287883 A | 10/2004 |
| JP | 2008-040718 A | 2/2008 |

\* cited by examiner

ANALYSIS SYSTEM INCLUDING ANALYSIS ENGINES EXECUTING PREDETERMINED ANALYSIS AND ANALYSIS EXECUTING PART CONTROLLING OPERATION OF ANALYSIS ENGINES AND CAUSING ANALYSIS ENGINES TO EXECUTE ANALYSIS

TECHNICAL FIELD

The present invention relates to an analysis system, more specifically, relates to an analysis system that has a function of controlling the operation of an analysis engine installed therein.

BACKGROUND ART

In recent years, analysis engines that analyze various data have been developed with development of information processing techniques. Various analysis engines, for example, an analysis engine that generates location information tracing the flow of a person from moving image data, an analysis engine that specifies a person from still image data, and an analysis engine that generates text data from speech data have been developed.

Further, an analysis system that combines the same type or different types of analysis engines to produce various analysis results from input data has also been developed. It can be applied to, for example, a system that executes an analysis such as processing video data inputted from a camera by using a flow extraction engine, a face extraction engine, an age determination engine and so on in parallel or in series and thereby determining a person of a given behavior. Moreover, there is an analysis system that executes image processing in another stage as described in Patent Document 1.

Patent Document 1: Japanese Unexamined Patent Application Publication No. 2003-303102

Although an analysis system that combines a plurality of analysis engines as described above needs continuous data processing by the respective analysis engines and needs real-time analysis, processing by a certain one of the analysis engines may delay. Thus, there arises a problem that processing by the whole analysis system delay and a required analysis result cannot be quickly obtained. On the other hand, in a case where sufficient processing performance is given to an information processing device in which the respective analysis engines are installed for the purpose of preventing delay of analysis, a problem of increase of the cost of the system arises.

SUMMARY

Accordingly, an object of the present invention is to provide an analysis system that can suppress delay of analysis and increase of the cost that are the abovementioned problems.

An analysis system as an aspect of the present invention includes: analysis engines each executing predetermined analysis; an analysis executing part controlling operation of the analysis engines and causing the analysis engines to execute analysis; and a processing performance control part controlling processing performance of the analysis engines.

The processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

Further, a program as another aspect of the present invention is a computer program including instructions for causing an information processing device including analysis engines each executing predetermined analysis to realize: an analysis executing part controlling operation of the analysis engines and causing the analysis engines to execute analysis; and a processing performance control part controlling processing performance of the analysis engines.

The computer program also includes instructions for realizing that the processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

Further, an analysis method as another aspect of the present invention is a method for analysis by an information processing device including analysis engines each executing predetermined analysis, and the analysis method includes:

by an analysis executing part, controlling operation of the analysis engines and causing the analysis engines to execute analysis; and by a processing performance control part, controlling processing performance of the analysis engines, The processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

With the configurations as described above, the present invention can provide an analysis system capable of achieving increase of analysis performance while suppressing the cost.

EXEMPLARY EMBODIMENTS

First Exemplary Embodiment

Figure 3:
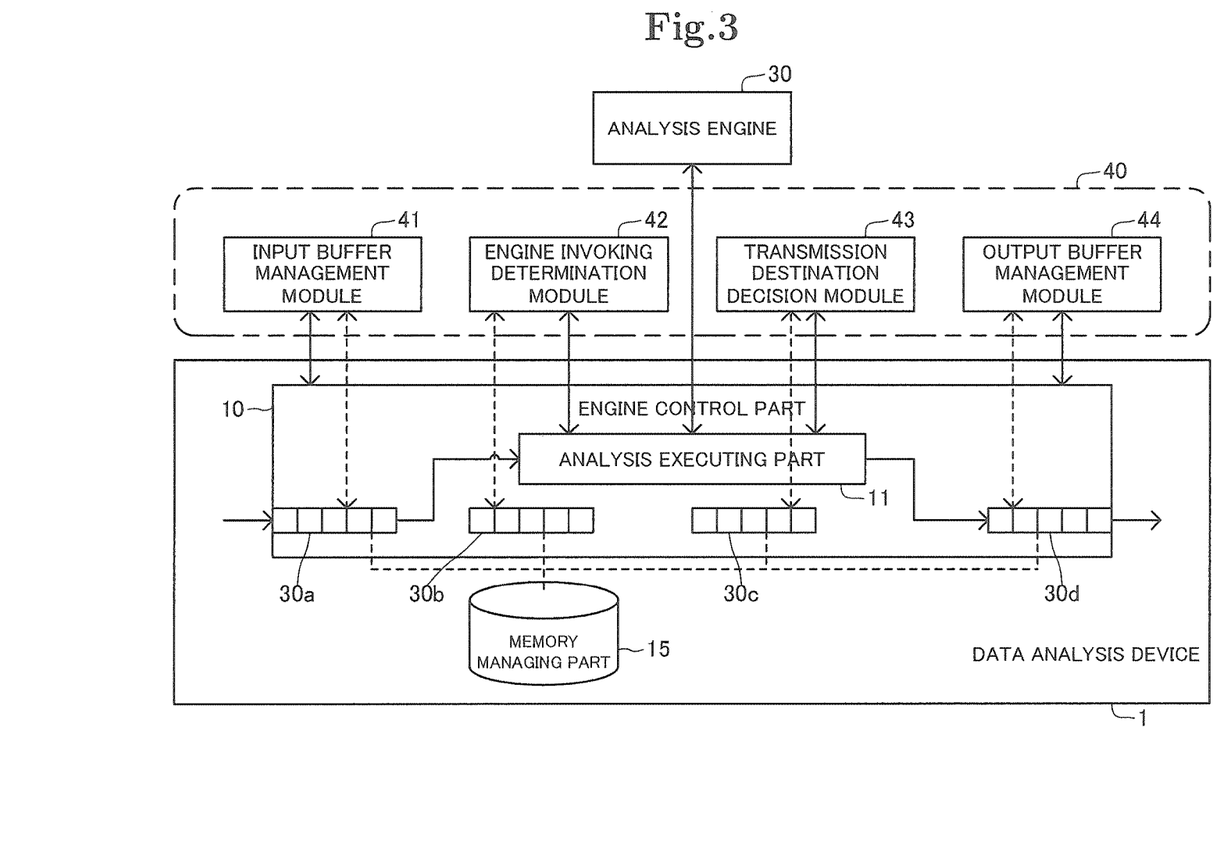
FIG. 3 is a block diagram showing the configuration of part of a data analysis device disclosed in FIG. 2.
Figure 4:
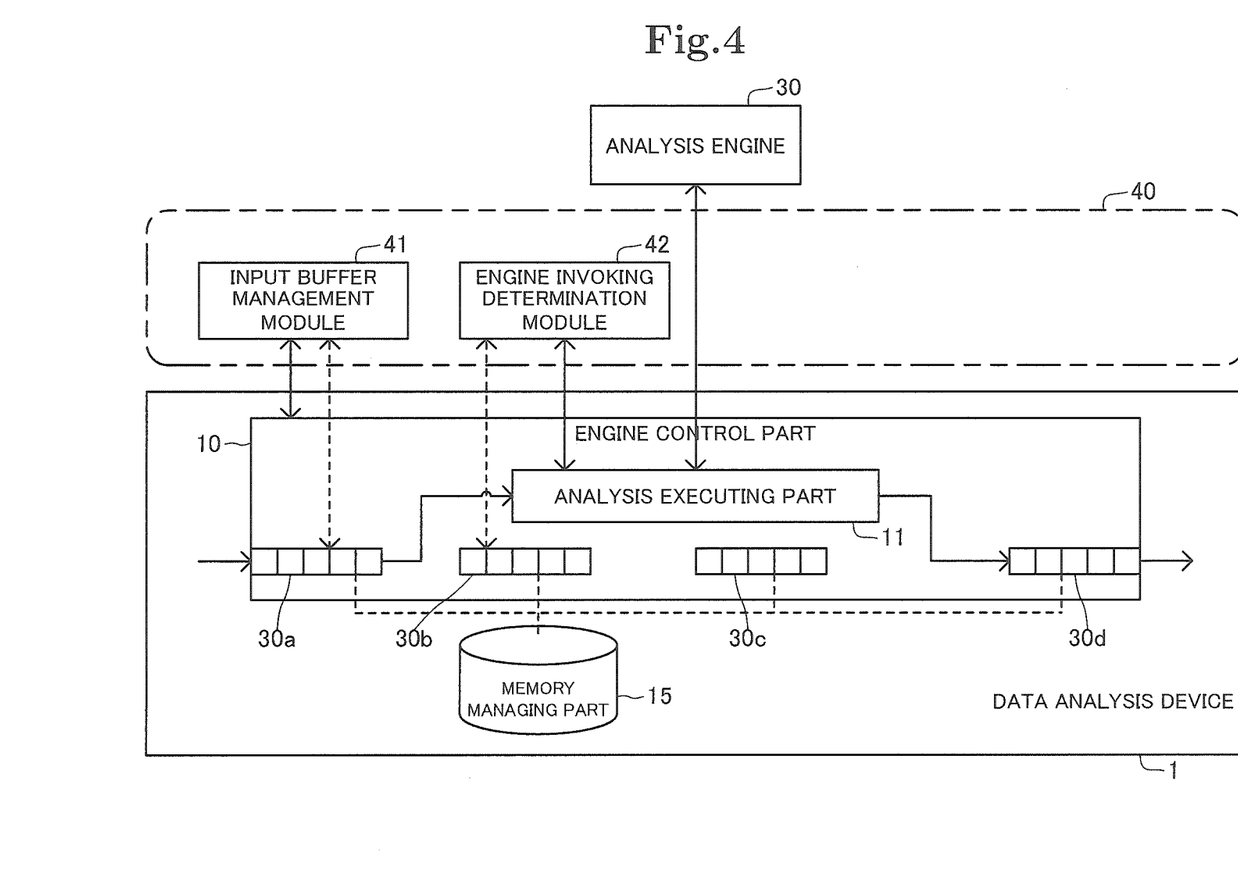
FIG. 4 is a block diagram showing the configuration of part of the data analysis device disclosed in FIG. 2.
Figure 5:
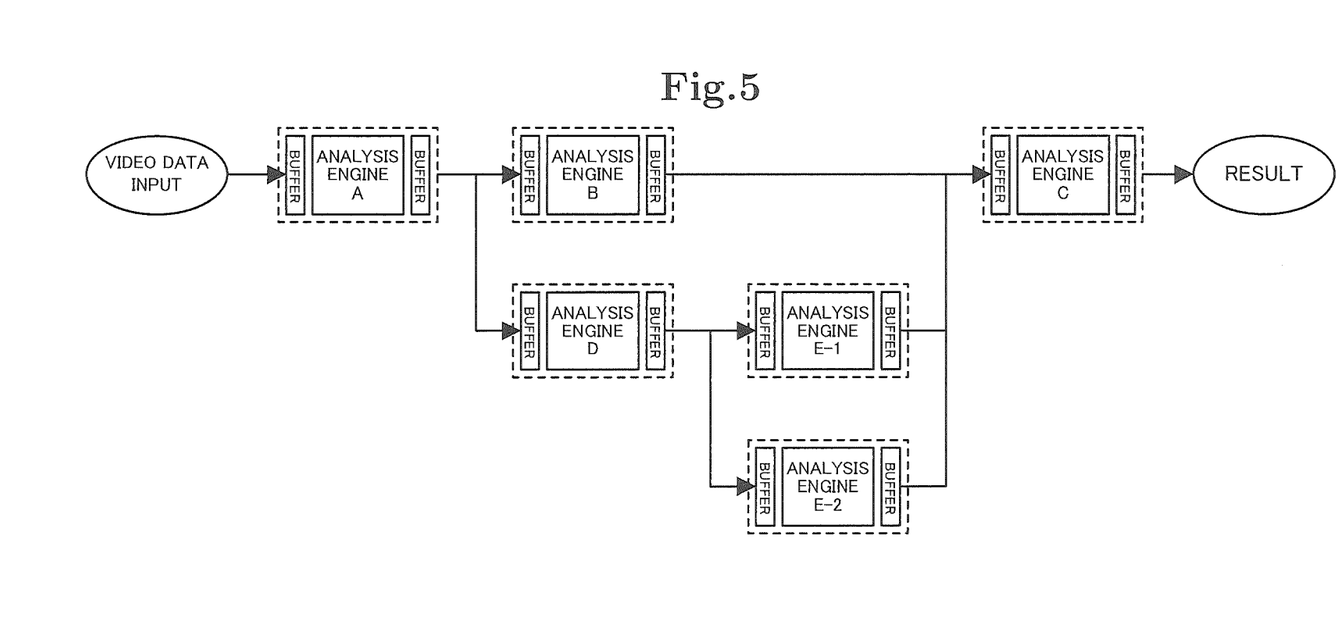
FIG. 5 is a diagram showing how the analysis system disclosed in FIG. 2 executes an analysis.
Figure 6:
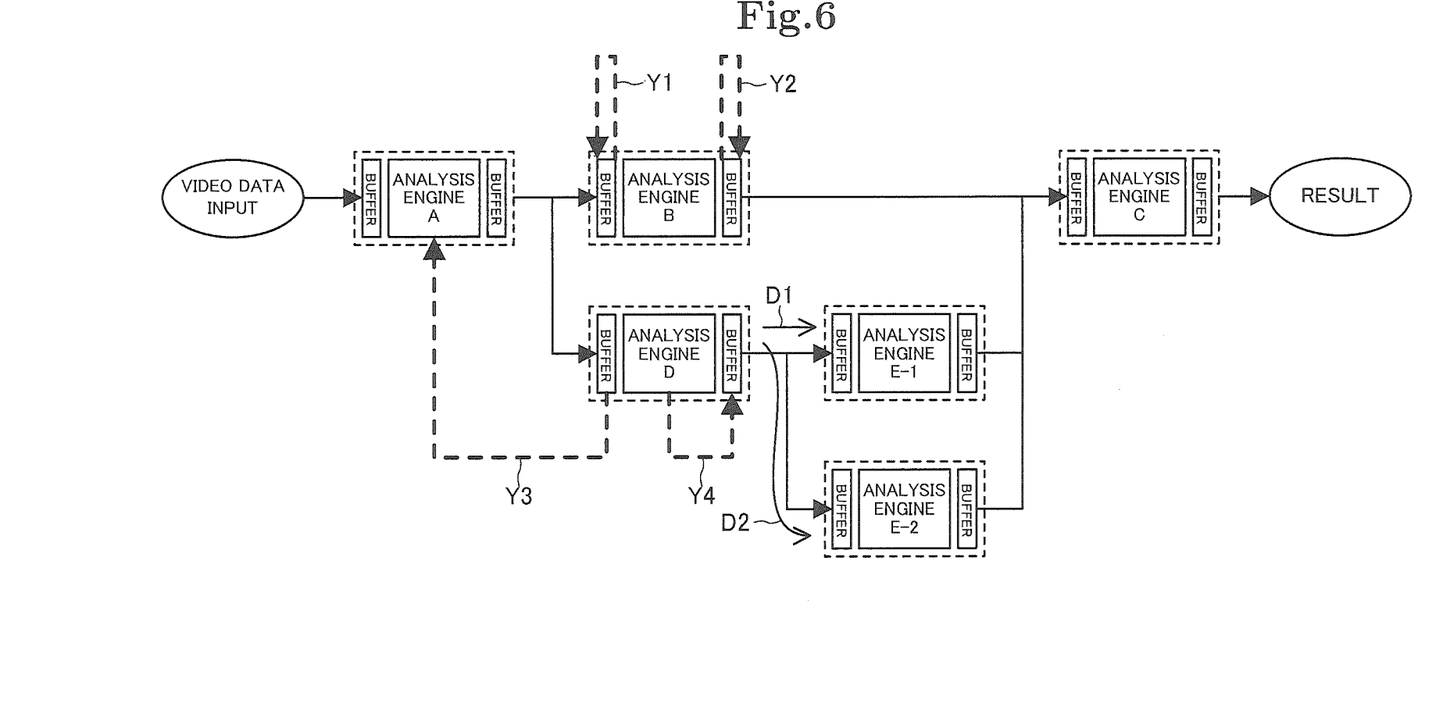
FIG. 6 is a diagram showing how the analysis system disclosed in FIG. 2 executes an analysis.
Figure 7:
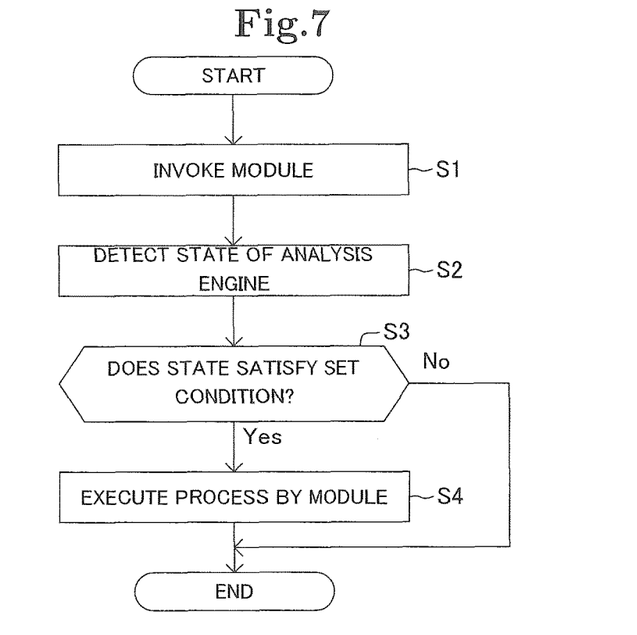
FIG. 7 is a flowchart showing the operation of each module disclosed in FIG. 4.

A first exemplary embodiment of the present invention will be described referring to FIGS. 1 to 7. FIGS. 1 to 4 are diagrams for describing the configuration of an analysis system according to this exemplary embodiment, and FIGS. 5 to 7 are diagrams for describing the operation of the analysis system.

Figure 1:
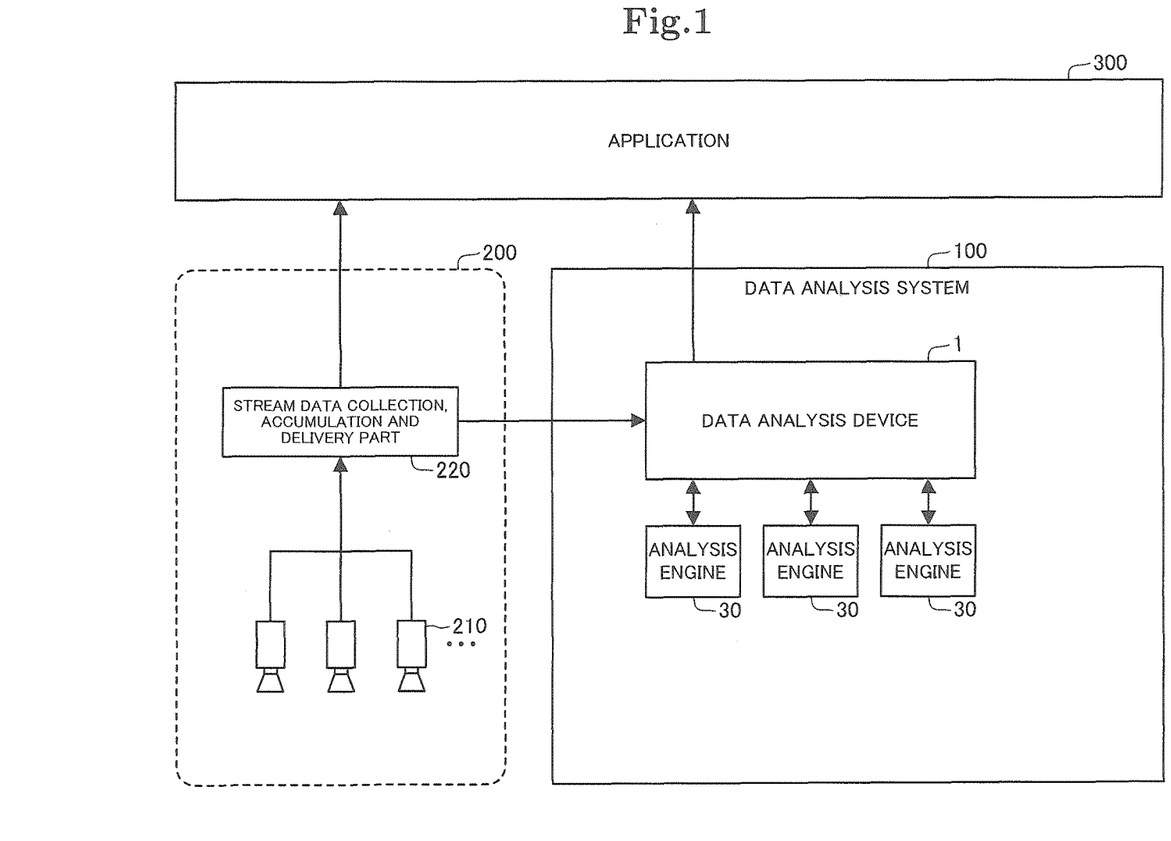
FIG. 1 is a diagram showing an example of an analysis system according to the present invention.

The analysis system shown in FIG. 1 includes a data analysis system 100 configured by an information processing device or a plurality of information processing devices, a data acquisition system 200 that acquires analysis target data as an analysis target, and an application 300 that requests analysis of analysis target data and acquires an analysis result.

For example, the application 300 is installed in an information processing terminal operated by a user and is connected to the data acquisition system 200 and the data analysis system 100 via a network. Thus, the application 300 requests the data acquisition system 200 and the data analysis system 100 to execute an analysis and acquires an analysis result.

The data acquisition system 200 includes a camera 210 that acquires video data (stream data) as analysis target data, and a stream data collection, accumulation and delivery part 220 that collects acquired video data and delivers to the data analysis system 100. This exemplary embodiment illustrates a case where analysis target data to be analyzed by the data analysis system 100 is video data, but the analysis target data may be any data, for example, audio data and image data. Therefore, analysis target data acquired by the data acquisition system 200 may be any data.

The data analysis system 100 includes a plurality of analysis engines 30, and also includes a data analysis device 1 that analyzes video data as analysis target data by using the analysis engines 30.

Figure 2:
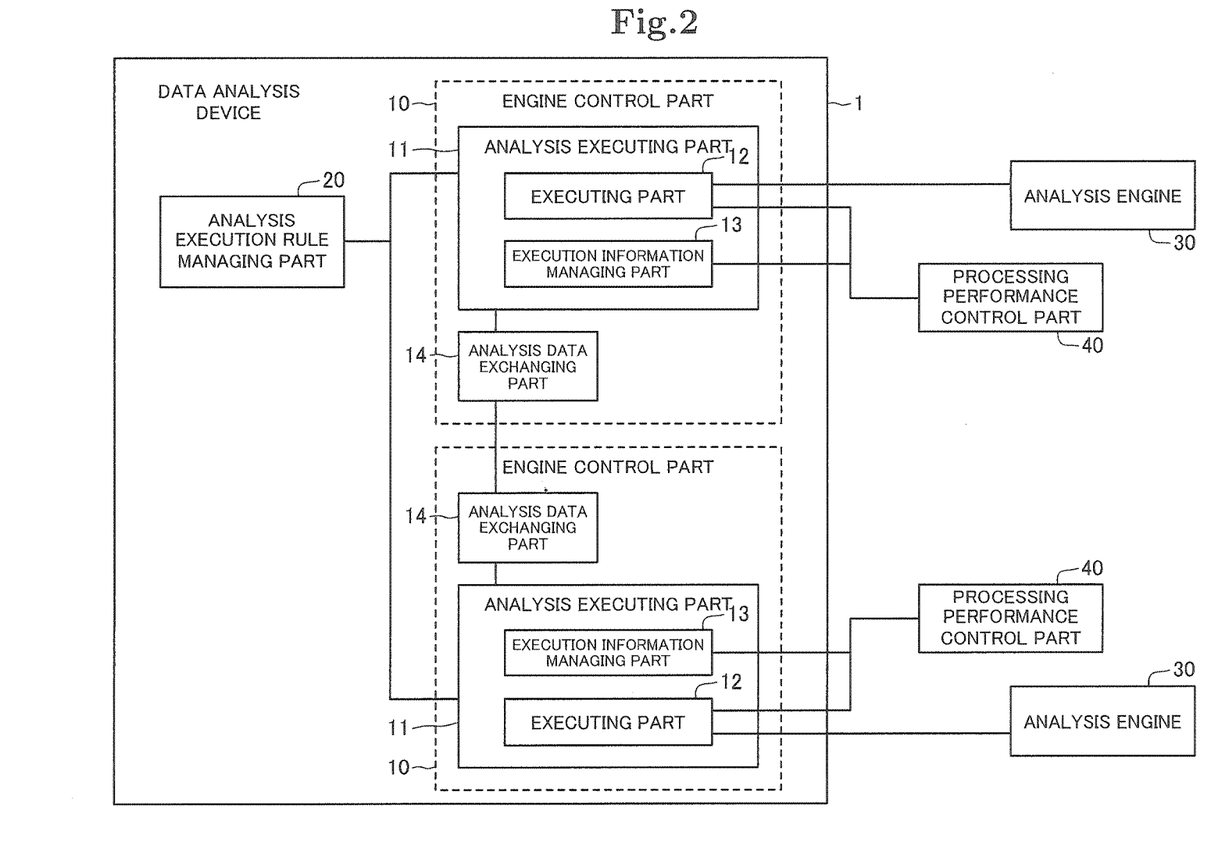
FIG. 2 is a block diagram showing the configuration of the analysis system according to the present invention.

Below, the data analysis device 1 as a characteristic part of the present invention will be described in detail. As shown in FIG. 2, the data analysis device 1 is connected to the plurality of analysis engines 30, and includes engine control parts 10 corresponding to the respective analysis engines 30. The engine control part 10 includes an analysis executing part 11, and the analysis executing part 11 includes an executing part 12 and an execution information managing part 13.

The execution information managing part 13 has a function of managing input data that is analysis target data to be analyzed by the analysis engine 30 and output data that is the result of analysis by the analysis engine 30. The execution information managing part 13 includes an input buffer that temporarily stores the input data and an output buffer that temporarily stores the output data.

The executing part 12 controls execution of analysis by the corresponding analysis engine 30, thereby causing the analysis engine 30 to execute analysis of input data stored in the input buffer of the execution information managing part 13 and storing the result of the analysis into the output buffer of the execution information managing part 13.

An analysis data exchanging part 14 outputs output data that is the result of analysis by the analysis engine 30 to a previously set output destination such as another analysis engine located on the latter stage side of the analysis engine 30.

The respective parts 10 to 14 and 20 included by the data analysis device 1 are realized by installation of a program into the information processing device configuring the data analysis device 1.

The analysis engines 30 are, for example, a flow extraction engine that extracts the flow of an object from acquired video data, a face extraction engine that extracts the face of a person in the video data, an age determination engine that determines the age of a person in the video data, and so on. An analysis execution rule representing an analysis procedure executed in combination of the analysis engines 30 is previously set and stored in an analysis execution rule managing part 20. For example, the analysis execution rule is that, as shown in FIG. 5, an analysis engine A processes inputted video data and outputs the result of the analysis to an analysis engine B and an analysis engine D, the respective engines analyze, the analysis engine D outputs the result of the analysis to an analysis engine E-1 and an analysis engine E-2, the respective engines analyze, and the results of the analyses by the analysis engines B, E-1 and E-2 are outputted to an analysis engine C and analyzed thereby. In this instance, with respect to a certain analysis engine, another analysis engine located on a side where input data is inputted will be referred to as a former stage, and another analysis engine located on a side where the output data is outputted from the certain analysis engine will be referred to as a latter stage. In other words, with reference to a certain analysis engine, the left side will be referred to as a former stage side and the right side will be referred to as a latter stage in FIG. 5.

Further, the data analysis system 100 includes, for each of the analysis engines 30, a processing performance control part 40 that controls the processing performance of the analysis engines 30. In other words, as shown in FIG. 2, one or more processing performance control parts 40 are connected to the data analysis device 1 for each of the analysis engines 30, and the processing performance control parts 40 are each configured by a processing module independent of the analysis engines 30 and the analysis executing parts 11. The processing performance control part 40 is realized by installation of a program into the information processing device configuring the data analysis device 1 or another information processing device connected to the data analysis device 1.

The processing performance control part 40 has a function of being invoked when the analysis executing part 11 causes the corresponding analysis engine 30 to execute an analysis (step S1 of FIG. 7), detecting state information representing the state of the analysis engine 30 (step S2 of FIG. 7) and, based on the detected status information (Yes in step S3 of FIG. 7), executing a previously set process (step S4 of FIG. 7). For example, the processing performance control part 40 is an input buffer management module 41, an engine invoking determination module 42, a transmission destination decision module 43 and an output buffer management module 44 as shown in FIG. 3. They have the following functions, respectively.

When the input buffer management module 41 is invoked, the input buffer management module 41 firstly detects, as the status information of the corresponding analysis engine 30, the input status of input data inputted into the analysis engine 30, specifically, the accumulation status of input data in an input buffer 30a. When it is detected that the capacity of the input buffer 30a is full of input data, the input buffer management module 41 executes a process of discarding input data to be newly inputted (see arrow Y1 in an analysis engine B of FIG. 6). Alternatively, when it is detected that the capacity of the input buffer is full of input data, the input buffer management module 41 executes a process of discarding the oldest input data of the input data accumulated in the input buffer. Alternatively, when it is detected that the capacity of the input buffer is full of input data, the input buffer management module 41 executes a process of randomly discarding input data of the input data accumulated in the input buffer. Consequently, less data is inputted into the analysis engine 30 whose state is detected by the input buffer management module 41.

Further, the input buffer management module 41 also executes a process of, in accordance with the state information of the corresponding analysis engine 30, controlling the performance of another analysis engine 30. For example, when detecting that the capacity of the input buffer 30a of the corresponding analysis engine 30 is full, the input buffer management module 41 executes a process of discarding part of input data accumulated in an input buffer of another analysis engine 30 (e.g., an analysis engine A in FIG. 6) located on the former stage side of the corresponding analysis engine 30 (e.g., an analysis engine D in FIG. 6) (see arrow Y3 directing from the analysis engine D to the analysis engine A in FIG. 6). In this instance, the input buffer management module 41 may delete the oldest input data of the input data accumulated in the input buffer of the analysis engine 30 on the former stage, or may delete at random. Consequently, less data is inputted into the analysis engine 30, which is located on the latter stage side of the analysis engine that the input data in input buffer is discarded, and whose state is detected by the input buffer management module 41.

The input buffer management module 41 may discard at least part of input data to be inputted into the input buffer of the corresponding analysis engine 30 or input data accumulated in the input buffer in accordance with a predetermined standard or at random so that the capacity of the input buffer becomes equal to or less than a given level.

With the input buffer management module 41 having the function as described above, in a case where processing of input data by a certain analysis engine 30 falls behind, the amount of the input data decreases, for example, by reduction of the input data before analysis. Therefore, it is possible to achieve increase of throughput by the analysis engine 30 though there is an effect such as deterioration of the accuracy of the analysis result later.

Further, when the engine invoking determination module 42 is invoked, the engine invoking determination module 42 firstly detects, as the state information of the corresponding analysis engine 30, the input status of input data inputted into the analysis engine, specifically, whether the input buffer 30a stores input data or not. When detecting that the input buffer 30a stores input data, the engine invoking determination module 42 executes a process of invoking the analysis engine 30 so that the analysis engine 30 executes an analysis on the input data. Moreover, the engine invoking determination module 42 detects the number of times per unit time that the corresponding analysis engine 30 has been invoked as described above from a reference data list 30b in which the number of times is recorded and, in a case where the number of times exceeds a previously set upper limit value, executes a process of standing by before invoking the analysis engine for a predetermined time.

Further, when the transmission destination decision module 43 is invoked, the transmission destination decision module 43 firstly detects, as the state information of the corresponding analysis engine 30, the output status of output data outputted from the analysis engine 30, from an execution result list 30c in which the output status is recorded. When the number of output data outputted from the analysis engine 30 in one analysis exceeds a previously set threshold, the transmission destination decision module 43 executes a process of discarding part of the output data so that the number of the output data becomes equal to or less than the threshold (see arrow Y2 in the analysis engine B of FIG. 6). Consequently, less output data is outputted to another analysis engine 30 located on the latter stage, and load is thereby reduced.

Alternatively, when the number of output data outputted from the analysis engine 30 in one analysis exceeds a previously set threshold and a plurality of other analysis engines 30 identical to each other are located on the latter stage, the transmission destination decision module 43 executes a process of dividing and outputting the output data to the other analysis engines 30 on the latter stage (see arrow Y4 in the analysis engine D of FIG. 6). Describing with the example shown in FIG. 6, when the number of output data exceeds the threshold while the output data is outputted from the analysis engine D only to an analysis engine E-1 (see arrow D1), the transmission destination decision module 43 divides the output data into halves and outputs to the analysis engine E1 and an analysis engine E-2 (see arrow D1 and arrow D2). Consequently, analysis by the analysis engine E-1 is executed by the two analysis engines E1 and E2, so that it is possible to achieve load balancing.

Alternatively, when the number of output data outputted from the analysis engine 30 in one analysis exceeds a previously set threshold, the transmission destination decision module 43 executes a process of increasing priority representing a degree that analysis by the analysis engine 30 on the latter stage is executed more preferentially than analysis by another analysis engine. After the setting, analysis by the analysis engine 30 on the latter stage is preferentially executed.

When the output buffer management module 44 is invoked, the output buffer management module 44 firstly detects, as the state information of the corresponding analysis engine 30, the output status of output data outputted from the analysis engine, specifically, the accumulation status of output data in an output buffer 30d. When it is detected that the capacity of the output buffer 30d is full of output data, the output buffer management module 44 executes a process of discarding output data newly outputted from the analysis engine 30 without accumulating into the output buffer 30d (see arrow Y2 in the analysis engine B of FIG. 6). Alternatively, when it is detected that the capacity of the output buffer is full of output data, the output buffer management module 44 executes a process of discarding the oldest part of the output data accumulated in the output buffer or randomly discarding the output data.

Alternatively, when it is detected that the capacity of the output buffer is full of output data and another analysis engine is set as an output destination of the output data, the output buffer management module 44 executes a process of changing the output destination to another analysis engine on the latter stage. Describing with the example shown in FIG. 6, when the number of output data exceeds the threshold while the output data is outputted from the analysis engine D only to the analysis engine E-1 (see arrow D1), the output buffer management module 44 changes the output destination to the analysis engine E-2 and outputs the output data (see arrow D2). Consequently, analysis by the analysis engine E-1 is executed by the two analysis engines E-1 and E-2, so that it is possible to achieve load balancing.

A case where the capacity of an output buffer becomes full as described above is, for example, that data communication falls behind because of a communication delay, a fault of an analysis engine on the latter stage, and so on. In such a case, it is possible to solve the situation by discarding part of output data or changing an output destination as described above.

The abovementioned processing performance control part 40 is configured by a module such as the input buffer management module 41, and hence, can be easily attached to and detached from the data analysis system 100 as necessary. Therefore, as shown in FIG. 4, it is possible to easily detach the transmission destination decision module 43 and the output buffer management module 44 in the state shown in FIG. 3, and on the contrary, it is possible to easily attach the transmission destination decision module 43 and the output buffer management module 44 in the state shown in FIG. 4. When the respective modules are invoked by the engine control part 10 after the modules are attached, it is possible to detect the state of the analysis engine 30 as described above and set so as to operate in accordance with the detected state, thereby easily controlling the performance of the analysis engine.

Accordingly, depending on the configuration of the analysis system, it is possible to easily install a proper processing performance control part 40 that properly operates in accordance with the state of an analysis engine. As a result, it is possible to realize an analysis system capable of suppressing delay of analysis at low costs.

Although the input buffer management module 41, the engine invoking determination module 42, the transmission destination decision module 43 and the output buffer management module 44 are described above as examples of the processing performance control part 40, the processing performance control part 40 is not limited to the above and may be a module having another function.

<Supplementary Notes>

The whole or part of the exemplary embodiments disclosed above can be described as the following supplementary notes. Below, the outline of the configurations of an analysis system (see FIG. 8), a program and an analysis method according to the present invention will be described. However, the present invention is not limited to the following configurations.

(Supplementary Note 1)

Figure 8:
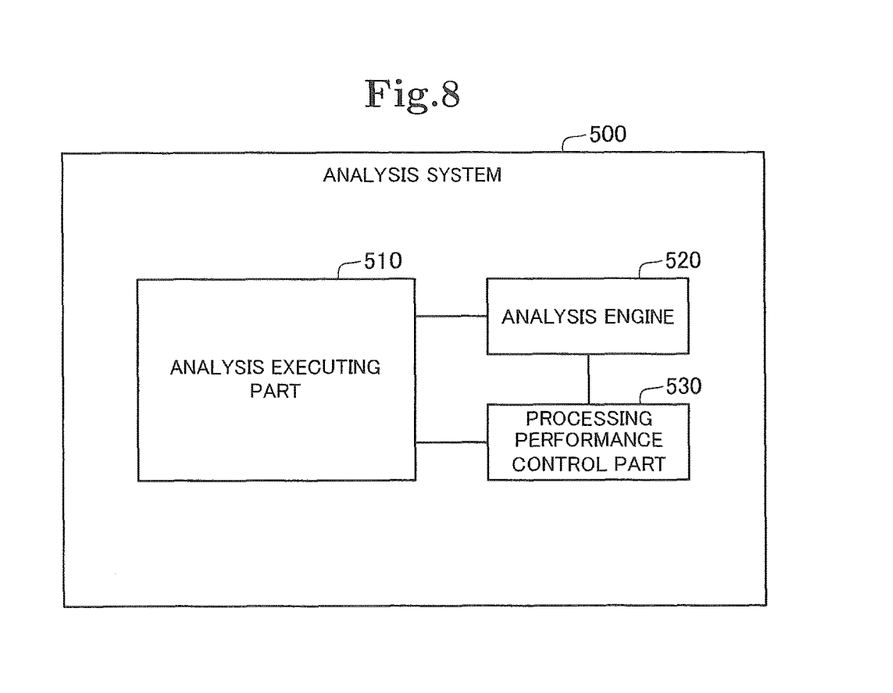
FIG. 8 is a block diagram showing a configuration according to Supplementary Note 1 of the present invention.

An analysis system 500 comprising: analysis engines 520 each executing predetermined analysis; an analysis executing part 510 controlling operation of the analysis engines 520 and causing the analysis engines to execute analysis; and a processing performance control part 530 controlling processing performance of the analysis engines 520, wherein the processing performance control part 530 is configured by a processing module that is independent of the analysis engines 520 and the analysis executing part 510 and that can be installed into the analysis system 500, and configured to be invoked by the analysis executing part 510 to detect state information representing a state of a specific one of the analysis engines 520 and execute a previously set process based on the detected state information.

(Supplementary Note 2)

The analysis system according to Supplementary Note 1, wherein the processing performance control part is configured to detect, as the state information, an input status of input data inputted into the specific analysis engine and execute a previously set process based on the detected state information.

(Supplementary Note 3)

The analysis system according to Supplementary Note 2, wherein the processing performance control part is configured to detect, as the state information, an accumulation status of an input buffer temporarily accumulating input data inputted into the specific analysis engine, and execute a previously set process based on the detected state information.

(Supplementary Note 4)

The analysis system according to Supplementary Note 3, wherein the processing performance control part is configured to detect, as the state information, an accumulation status of the input buffer of the specific analysis engine and, based on the detected state information, execute a process of discarding at least part of input data accumulated in the input buffer of the specific analysis engine from the input buffer.

(Supplementary Note 5)

The analysis system according to Supplementary Note 3 or 4, wherein the processing performance control part is configured to detect, as the state info information, an accumulation status of the input buffer of the specific analysis engine and, based on the detected state information, execute a process of discarding at least part of input data accumulated in another input buffer temporarily accumulating input data inputted into another one of the analysis engines located on a former stage side of the specific analysis engine, from the other input buffer.

(Supplementary Note 6)

The analysis system according to any of Supplementary Notes 1 to 5, wherein the processing performance control part is configured to detect, as the state information, an output status of output data outputted from the specific analysis engine and execute a previously set process based on the detected state information.

(Supplementary Note 7)

The analysis system according to Supplementary Note 6, wherein the processing performance control part is configured to detect, as the state information, an output status of output data outputted from the specific analysis engine and, based on the detected state information, execute a process of discarding at least part of the output data outputted from the specific analysis engine to another one of the analysis engines located on a latter stage side of the specific analysis engine.

(Supplementary Note 8)

The analysis system according to Supplementary Note 6 or 7, wherein the processing performance control part is configured to detect, as the state information, an output status of output data outputted from the specific analysis engine and, based on the detected state information, execute a process of outputting, in a distributed manner, the output data outputted from the specific analysis engine to a plurality of another ones of the analysis engines located on a latter stage side of the specific analysis engine.

(Supplementary Note 9)

The analysis system according to any of Supplementary Notes 6 to 8, wherein the processing performance control part is configured to detect, as the state information, an output status of output data outputted from the specific analysis engine and, based on the detected state information, execute a process of changing an output destination of the output data so that the output data outputted from the specific analysis engine to another one of the analysis engines located on a latter stage side of the specific analysis engine is outputted to another one of the analysis engines located on the latter stage side of the specific analysis engine.

(Supplementary Note 10)

The analysis system according to any of Supplementary Notes 6 to 9, wherein the processing performance control part is configured to detect, as the state information, an output status of output data outputted from the specific analysis engine and, based on the detected state information, execute a process of setting priority representing a degree that analysis by another one of the analysis engines located on a latter stage side of the specific analysis engine is executed more preferentially than other analysis.

(Supplementary Note 11)

The analysis system according to any of Supplementary Notes 1 to 10, wherein the processing performance control part is configured to detect, as the state information, an input status of input data inputted into the specific analysis engine and execute a process of invoking the specific analysis engine based on the detected state information.

(Supplementary Note 12)

The analysis system according to Supplementary Note 11, wherein the processing performance control part is configured to detect a number of times of invoking the specific analysis engine per unit time and, in a case where the number of times of invoking exceeds a previously set upper limit value, execute a process of standing by for a predetermined time before invoking the specific analysis engine.

(Supplementary Note 13)

A computer program comprising instructions for causing an information processing device including analysis engines each executing predetermined analysis to realize: an analysis executing part controlling operation of the analysis engines and causing the analysis engines to execute analysis; and a processing performance control part controlling processing performance of the analysis engines, the computer program also comprising instructions for realizing that the processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

(Supplementary Note 14)

The computer program according to Supplementary Note 13, wherein the processing performance control part is configured to detect, as the state information, an input status of input data inputted into the specific analysis engine and execute a previously set process based on the detected state information.

(Supplementary Note 15)

A method for analysis by an information processing device including analysis engines each executing predetermined analysis, the analysis method comprising:

by an analysis executing part, controlling operation of the analysis engines and causing the analysis engines to execute analysis; and by a processing performance control part, controlling processing performance of the analysis engines, wherein the processing performance control part is configured by a processing module that is independent of the analysis engines and the analysis executing part and that can be installed into the analysis system, and configured to be invoked by the analysis executing part to detect state information representing a state of a specific one of the analysis engines and execute a previously set process based on the detected state information.

(Supplementary Note 16)

The analysis method according to Supplementary Note 15, wherein the processing performance control part is configured to detect, as the state information, an input status of input data inputted into the specific analysis engine and execute a previously set process based on the detected state information.

The abovementioned program is stored in a storage device or recorded on a computer-readable recording medium. For example the recording medium is a portable medium such as a flexible disk, an optical disk, a magneto-optical disk and a semiconductor memory.

Although the present invention is described above referring to the exemplary embodiment and so on, the present invention is not limited to the above exemplary embodiment. The configurations and details of the present invention can be modified in various manners that can be understood by one skilled in the art within the scope of the present invention.

The present invention is based upon and claims the benefit of priority from Japanese patent application No. 2011-245149, filed on Nov. 9, 2011, the disclosure of which is incorporated herein in its entirety by reference.

DESCRIPTION OF REFERENCE NUMERALS 1 data analysis device
10 engine control part
11 analysis executing part
12 executing part
13 execution information managing part
14 analysis data exchanging part
20 analysis execution rule managing part
30 analysis engine
40 processing performance control part
41 input buffer management module
42 engine invoking determination module
43 transmission destination decision module
44 output buffer management module
100 data analysis system
200 data acquisition system
210 camera
220 stream data collection, accumulation and delivery part
300 application

The invention claimed is:

1. An analysis system, comprising:
analysis engines each executing predetermined analysis;
an analysis executing part controlling operation of the analysis engines and causing the analysis engines to execute analysis; and
a processing performance control part controlling processing performance of the analysis engines,
wherein the processing performance control part is configured by a processing module that is independent of the analysis engines and the analysis executing part and that is configured to be installed into the analysis system, and is configured to be invoked by the analysis executing part to detect state information representing a state of a specific one of the analysis engines and execute a previously set process based on the detected state information, and
wherein the processing performance control part is configured to detect, as the state information, an accumulation status of an input buffer temporarily accumulating input data inputted into a specific analysis engine and, based on the detected state information, execute a process of discarding by reduction at least a part of input data accumulated in another input buffer temporarily accumulating input data inputted into another one of the analysis engines located on a former stage side of the specific analysis engine, from the other input buffer.

2. The analysis system according to claim 1, wherein the processing performance control part is configured to detect, as the state information, an output status of output data outputted from the specific analysis engine and execute a previously set process based on the detected state information.

3. The analysis system according to claim 2, wherein the processing performance control part is configured to detect, as the state information, an output status of output data outputted from the specific analysis engine and, based on the detected state information, execute a process of discarding at least part of the output data outputted from the specific analysis engine to another one of the analysis engines located on a latter stage side of the specific analysis engine.

4. The analysis system according to claim 2, wherein the processing performance control part is configured to detect, as the state information, an output status of output data outputted from the specific analysis engine and, based on the detected state information, execute a process of outputting, in a distributed manner, the output data outputted from the specific analysis engine to a plurality of another ones of the analysis engines located on a latter stage side of the specific analysis engine.

5. The analysis system according to claim 2, wherein the processing performance control part is configured to detect, as the state information, an output status of output data outputted from the specific analysis engine and, based on the detected state information, execute a process of changing an output destination of the output data so that the output data outputted from the specific analysis engine to another one of the analysis engines located on a latter stage side of the specific analysis engine is outputted to another one of the analysis engines located on the latter stage side of the specific analysis engine.

6. The analysis system according to claim 2, wherein the processing performance control part is configured to detect, as the state information, an output status of output data outputted from the specific analysis engine and, based on the detected state information, execute a process of setting priority representing a degree that analysis by another one of the analysis engines located on a latter stage side of the specific analysis engine is executed more preferentially than other analysis.

7. The analysis system according to claim 1, wherein the processing performance control part is configured to detect, as the state information, an input status of input data inputted into the specific analysis engine and execute a process of invoking the specific analysis engine based on the detected state information.

8. The analysis system according to claim 7, wherein the processing performance control part is configured to detect a number of times of invoking the specific analysis engine per unit time and, in a case where the number of times of invoking exceeds a previously set upper limit value, execute a process of standing by for a predetermined time before invoking the specific analysis engine.

9. The analysis system according to claim 1, wherein the analysis system is configured to analyte video data.

10. The analysis system according to claim 9, wherein the video data includes audio data and image data.

11. The analysis system according to claim 1, wherein, when processing of the input data by the specific analysis engine falls behind, an amount of the input data decreases.

12. The analysis system according to claim 1, wherein, when processing of the input data by the specific analysis engine falls behind, an amount of the input data decreases by reduction of the input data before analysis.

13. A non-transitory computer-readable medium storing a program comprising instructions for causing an information processing device including analysis engines each executing predetermined analysis to realize:
an analysis executing part controlling operation of the analysis engines and causing the analysis engines to execute analysis; and
a processing performance control part controlling processing performance of the analysis engines,
the program further comprising instructions for realizing that the processing performance control part is configured by a processing module that is independent of the analysis engines and the analysis executing part and that is configured to be installed into an analysis system, and is configured to be invoked by the analysis executing part to detect state information representing a state of a specific one of the analysis engines and execute a previously set process based on the detected state information,
wherein the processing performance control part is configured to detect, as the state information, an accumulation status of an input buffer temporarily accumulating input data inputted into a specific analysis engine and, based on the detected state information, execute a process of discarding by reduction at least a part of input data accumulated in another input buffer temporarily accumulating input data inputted into another one of the analysis engines located on a former stage side of the specific analysis engine, from the other input buffer.

14. A method for analysis by an information processing device including analysis engines each executing predetermined analysis, the method comprising:
by an analysis executing part, controlling operation of the analysis engines and causing the analysis engines to execute analysis; and
by a processing performance control part, controlling processing performance of the analysis engines,
wherein the processing performance control part is configured by a processing module that is independent of the analysis engines and the analysis executing part and that is configured be installed into an analysis system, and further is configured to be invoked by the analysis executing part to detect state information representing a state of a specific one of the analysis engines and execute a previously set process based on the detected state information,
wherein the processing performance control part is configured to detect, as the state information, an accumulation status of an input buffer temporarily accumulating input data inputted into a specific analysis engine and, based on the detected state information, execute a process of discarding by reduction at least a part of input data accumulated in another input buffer temporarily accumulating input data inputted into another one of the analysis engines located on a former stage side of the specific analysis engine, from the other input buffer.

* * * * *

UNITED STATES PATENT AND TRADEMARK OFFICE
CERTIFICATE OF CORRECTION

PATENT NO. : 9,626,273 B2
APPLICATION NO. : 14/355834
DATED : April 18, 2017
INVENTOR(S) : Koyama et al.

It is certified that error appears in the above-identified patent and that said Letters Patent is hereby corrected as shown below:

On the Title Page

1. Item (22), the International Application filing date being changed from "PCT Filed: Sep. 8, 2012" to "PCT Filed: Sep. 18, 2012".

Signed and Sealed this
First Day of August, 2017

Joseph Matal
*Performing the Functions and Duties of the*
*Under Secretary of Commerce for Intellectual Property and*
*Director of the United States Patent and Trademark Office*